United States Patent [19]
Engel et al.

[11] Patent Number: 5,181,399
[45] Date of Patent: Jan. 26, 1993

[54] LAUNDRY WASTE WATER TREATMENT AND WASH APPARATUS

[75] Inventors: Richard B. Engel, Ft. Pierce; John B. Gallo, Port St. Lucie; Donald H. Bladen, Vero Beach; Virginia F. Engel, Ft. Pierce, all of Fla.

[73] Assignee: Tri-O-Clean Laundry Systems, Inc., Fort Pierce, Fla.

[21] Appl. No.: 847,277

[22] Filed: Mar. 10, 1992

Related U.S. Application Data

[62] Division of Ser. No. 660,935, Feb. 26, 1991, Pat. No. 5,097,556.

[51] Int. Cl.$^5$ .............................................. D06F 39/08
[52] U.S. Cl. ................................. 68/13 R; 68/18 F; 68/207; 422/186.12; 422/186.19
[58] Field of Search ................ 8/158; 68/13 R, 18 R, 68/18 F, 183, 207, 902; 422/186.12, 186.18, 186.19

[56] References Cited

U.S. PATENT DOCUMENTS

| | | | |
|---|---|---|---|
| 2,529,802 | 11/1950 | Glass | 68/183 |
| 3,065,620 | 11/1962 | Houser | 68/13 R |
| 3,130,570 | 4/1964 | Rentzepis | 68/13 R |
| 3,194,628 | 7/1965 | Cannon | 68/13 R X |
| 4,159,971 | 7/1979 | Gneupel | 422/186.19 |
| 4,654,199 | 3/1987 | Gloor et al. | 422/186.19 |
| 4,869,881 | 9/1989 | Collins | 422/186.18 |
| 4,988,484 | 1/1991 | Karlson | 422/186.18 X |
| 5,009,858 | 4/1991 | Mechterscheimer | 422/186.18 X |

FOREIGN PATENT DOCUMENTS 2910140  9/1980  Fed. Rep. of Germany ........ 68/902

*Primary Examiner*—Philip R. Coe
*Attorney, Agent, or Firm*—N. J. Aquilino

[57] ABSTRACT

A method and apparatus for washing laundry without hot water and detergent using a closed loop ozonated wash water system wherein wash water maintained in a storage tank is ozonated by an ozone generator prior to use in a washing machine. The spent wash water is collected, filtered and reused thereby eliminating waste water disposal problems an resulting in considerable water and energy savings. The ozone generator includes a unique air flow configuration to maximize ozone generation resulting in a high efficiency washing system.

21 Claims, 2 Drawing Sheets

LAUNDRY WASTE WATER TREATMENT AND WASH APPARATUS

RELATED APPLICATIONS

The present application is a Divisional application of Ser. No. 07/660,935, filed Feb. 26, 1991, and now U.S. Pat. No. 5,097,556, for LAUNDRY WASTE WATER TREATMENT AND WASH PROCESS.

BACKGROUND OF THE INVENTION

The present invention relates to a laundry waste water treatment and wash process and in particular to such a process using only ozone as the cleaning and disinfecting product.

Typically ozone is generated when oxygen, $O_2$, is exposed to ultraviolet light or an electrical charge which breaks it down to individual oxygen molecules. Some of these recombine into ozone, $O_3$. Ozone is the triatomic, allotropic form of oxygen $O_2$. It is an unstable gas with a pungent odor and it is normally produced in low concentrations. The chemically active $O_3$ then acts as an oxidant to break down compounds it comes in contact with.

When ozone is created by an ozonator, air is subjected to an electric discharge commonly known as a corona which is produced by an electric charge between parallel or concentric electrodes separated by a dielectric to prevent a spark discharge. Normally a blower forces air between the electrodes and when an alternating potential from 6,000–30,000 volts, depending upon the thickness of the air space and the dielectric material, is applied to the electrodes, the part of the oxygen in the air is transformed into charged oxygen atoms, ions, which conduct the electric current. Some of these ions recombine to form pre-atom molecules $O_3$ or ozone. Because the ozone is unstable, it is important to remove the ozone as quickly as possible after it is produced and normal ozonators provide a minimum air velocity for sufficient operation to remove the ozone from the electrodes. Increasing the frequency of the power supply to the ozonator increases both the current and the yield of ozone; however, very high frequencies often require water cooling of the electrodes. Because of its instability, the ozone must be generated at the point of application and prior art systems often do not produce enough ozone for a particular application.

Since ozone is a powerful oxidant, is well-known as a sterilizing and preserving agent as well as a chemical oxidizing agent. Among the uses for ozone are the sterilization and preservation of foods such as cheese, eggs, meat, poultry, fruit and so forth. Using ozone as a food preservation agent was known in the Republic of Germany in the early 20th century. It is also well-known in Australia to preserve meat using ozone in the mid-1930's. Ozone is well-known in the purifying and cleaning of water for a variety of purposes including drinking, bathing, cleaning and so forth.

Ozone also is used to control airborne organics, bacteria and viruses by chemically reacting with them. This makes ozone useful in health care applications as a disinfectant such as patient and operating rooms, physical therapy rooms, laundry and disposal rooms, food service industries, hotels, restaurants, livestock industries among others.

The prior art has recognized the usefulness of ozone with laundry washing processes. For example, Japanese Patent No. 2149293 relates to a wet clothes washing unit comprising a washing tank, a foaming device with a nozzle for dispersion of bubble generation and an ozone generator for feeding ozone containing air into the nozzle. The ozone is ejected in the form of bubbles through a porous plate which is transmitted to the wash water and laundry which helps clean the laundry without mechanical stirring to remove stains by a bleaching action. Spanish Patent No. 2,006,978 relates to an ozone generator for washing machines having an internal electrode encapsulated in the glass tube and a coaxial metal tube as an external electrode. Air is drawn by a pump over the generator electrode and passed into the wash bath. Japanese Patent No. 86-218,645 describes an electric washing machine with a built in bleaching function which incorporates an ozone generator and air diffuser pipe for blowing ozone into the washing machine to bleach clothes without using a bleaching agent. Belgian Patent No. 899,577 discloses a washing machine which agitates clothes with compressed air and ozone blown into the washing chamber. German Patent No. 3,232,057 discloses a washing machine with an ozone generator to kill bacteria using an ozone atomizer spray and feed channel which lead into the cleaning fluid vessel and acts during the rinsing phase. Another German Patent No. DE 3,007,670 describes a detergent free laundering process of textiles using an aqueous solution of bromide or bromic acid and ozone.

The present invention relates to a laundry waste water and wash treatment process wherein water is continually recycled and filtered in a washing machine system using ozone as the primary disinfecting, cleaning and bleaching agent. With this system, it is not necessary to use conventional detergents and soaps which make the water unusable except for an initial cleaning process. The process contemplates recycling the water, both during the cleaning cycle and the rinse cycle, without adverse effects to the washing process. Rather, ozone washed laundry exhibits a high quality of cleanliness and freedom from bacteria as well as providing an aesthetically clean looking and smelling laundry product.

In a preferred embodiment, water is recycled from a collection sump and is pumped to a storage tank where it is stored until it is needed for a wash cycle. When a wash cycle begins, the water is pumped from the storage tank, through a filtered line into a holding tank. The water is the holding tank is treated with ozone which is entrained into the holding tank water as it is being stored. The water in the holding tank is kept in a continual state of flow by being pumped from the tank bottom through a filter and returned to the top of the tank. When a wash cycle is activated, water is pumped directly to a washing machine or machines for use in a conventional wash cycle. After the wash cycle is complete, the water is drained into the sump and a rinse cycle is initiated by pumping additional water from the holding tank into the machines. With the present system there is no need for the water to be heated thereby enabling the fluid to be kept in a closed cycle system. Additional water is periodically added to either the storage tank or holding tank to compensate for the loss of water in the system due to evaporation, spillage and to replace the water removed by the wet laundry.

With the present system, using recycled water, water savings is considerable. When used in commercial and institutional locations, millions of gallons of water per year can be saved. The problem of eliminating waste water and the treatment of this water which in previous systems would eventually find its way back into the ecological water supply is eliminated. The ozonated wash water eliminates the use of soap and other sour and toxic chemicals and the resulting environmental degradation caused thereby. Not least of all, the present system increases the capacity of the washing machines in use, eliminates the use for hot water and generally greatly reduces the cost of laundry operations.

Among the objects of the present invention are the provision of an ozone laundry waste water treatment and wash system which saves water, eliminates the need for hot water, soap and chemicals and greatly reduces the costs of operation of the various systems.

These and other objects will become apparent with reference to the following drawings and specification.

DESCRIPTION OF THE PREFERRED EMBODIMENTS

Figure 1:
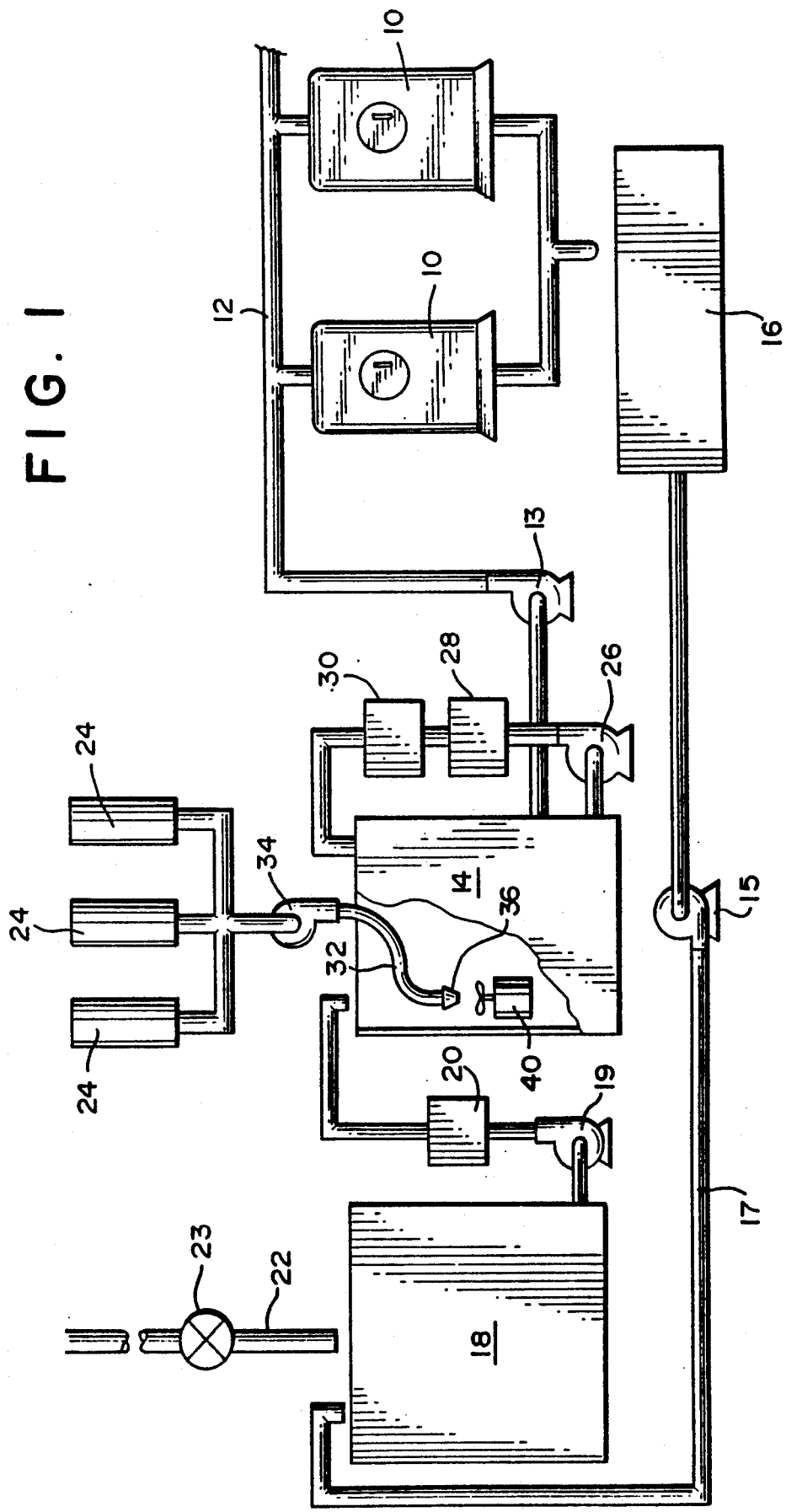
FIG. 1 illustrates a closed loop laundry waste water treatment and wash system in accordance with the present invention.

Referring to the drawings, the laundry waste water treatment and wash process includes a series of washing machines 10 such as are found in a commercial laundry institution, laundromat or similar establishment. Each machine is capable of being operated independently of the other and is supplied with water through a water supply line 12 connected to a water holding tank 14 which pumps the wash water into the machines 10 using a supply pump 13. The washing machines 10 are drained into a sump 16 which collects the waste water for recycling. After a wash cycle is completed, the water from the sump 16 is pumped by a sump pump 15 or gravity fed through a resupply line 17 to a storage tank 18 where it is collected. Prior to the initiation of a wash cycle, the water from the storage tank 18 is fed by a pump 19 through a filter 20 into the holding tank 14. A supply of fresh water may also be added through line 22 from a source (not shown) through a suitable valve 23 to replace the water which is lost during the wash cycle due to spillage, evaporation and the wetting of the laundry being washed. The holding tank 14 is provided with at least one and preferably a series of ozonators 24 which inject ozone into the water in the holding tank 14 at a controlled rate.

The ozone is entrained from the ozonators 24 through an ozone supply line 32 by an ozone pump 34 into the holding tank 14 using a nozzle 36 which directs the ozone against a rotating impeller 38 attached to and driven by a motor 40. The impeller 38 aids in thoroughly mixing the ozone within the water held in the holding tank 14. It will be appreciated that the motor 40 may be a submersible type or ma be located outside the holding tank 14 with a suitable mechanical connection to the impeller 38.

The water in the holding tank 14 is continuously circulated using a recirculation pump 26 which pumps water from the bottom of the holding tank 14, through filters 28 and 30, and back into the top of the tank 14. This recirculation of the water continuously cleans the water using the filters 28 and 30 and also creates a continuous agitation of the water in the holding tank which further aids in mixing the ozone in the water being stored in the holding tank 14.

Figure 3:
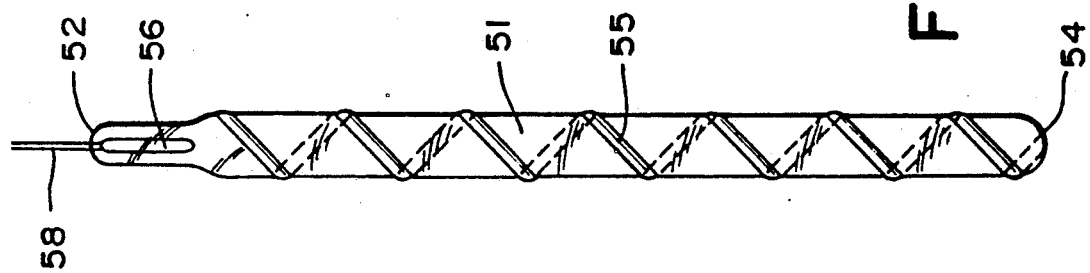
FIG. 3 illustrates a detail of the unit of FIG. 2.
Figure 2:
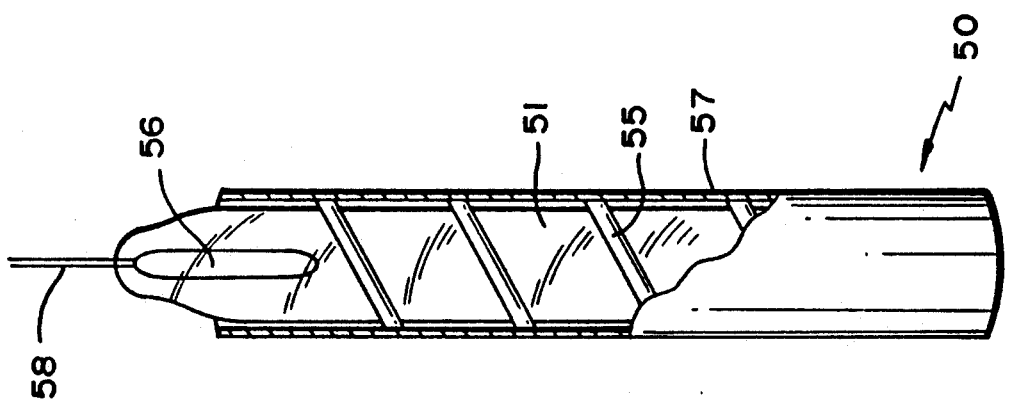
FIG. 2 illustrates a corona discharge unit used in the system of FIG. 1.

Referring to FIGS. 2 and 3, the ozonators 24 are formed of a plurality of corona discharge units 50. Each unit includes an evacuated glass envelope 51 which is generally cylindrical in shape having closed ends 52 and 54. The interior of the glass envelope 51 includes a permanently fixed electrode 56 having conductive leads 58 which are connected to a high voltage transformer (not shown) having a high voltage output, for example 10,000 volts. The interior of the envelope 51 is filled with an inert gas such as argon or the like or a combination of such gases. The outside surface of the glass envelope 51 is formed with a helical rib 55 extending the length of the envelope. The rib 55 may be glass integrally formed with the outside of the envelope or may be a teflon wrap or other similar material adhered to the outside of the envelope after it is made. The outer portion of the corona discharge unit 50 is formed with a metallic sleeve 57 closely fit to the helical rib 55 on the outside of the glass envelope 51 forming an air tight seal between the glass envelope 51 along the rib 55 and the metallic sleeve 57. This creates a helical air flow path from the top of the corona discharge unit 50 to the bottom. When the high voltage is impressed across the electrode 56, an electric field is produced which interacts with the inert gas creating a corona charge on the outside of the glass envelope 51. The corona charge interacts with the oxygen in the air, breaking it down into individual oxygen molecules 0. Some of these molecules recombine into the unstable $O_3$ form which is ozone. Air flows across the outside of the envelope 51 in the helical path formed between the envelope 51 and the outer metallic sleeve 57. This aids in breaking down the oxygen to ozone due to the increased time the air remains across the surface of the charged envelope 51. Preferably the air is either drawn by suction or pumped from one end of the tube to the other to facilitate continuous air flow and collection of the ozone.

Figure 4:
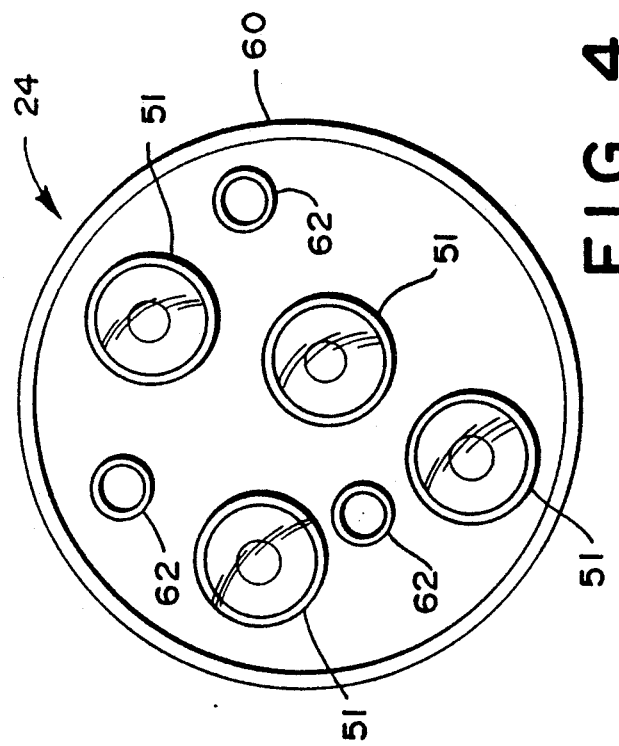
FIG. 4 is a top plan view of an ozonator used with the system of FIG. 1.

FIG. 4 illustrates a typical ozonator 24 as seen in plan. The ozonator 24 is formed with a series of corona discharge units 51 placed lengthwise in an outer housing 60 to create multiple sources of ozone. Typically 6 to 10 corona discharge units 51 are used with each ozonator, however, it will be appreciated that any number may be provided depending upon the requirements of the system. The housing 60 is provided with water cooled tubes 62 which circulate water or other cooling fluid within the ozonator to cool the corona discharge units.

Whereas FIG. 4 illustrates only a partially filled outer housing, it will be appreciated that the housing is sized to accommodate the number of corona discharge units and water cooled tubes.

As can be seen from the schematic of the wash system, a continuous, closed fluid flow loop is provided. In a typical closed loop washing system, such as might be found in an institution, commercial laundry or the like, a series of washing machines 10, each capable of washing a 125 pound load, are connected to a source of ozonated water washing fluid held in the water holding tank 14, capable of holding from 500 to 1,000 gallons of ozonated water. The machines 10 typically are designed to hold between 30 and 90 gallons of water for a given wash cycle. The washing fluid in the holding tank 14 is continuously circulated from the bottom of the tank to the top of the tank using the recirculating pump 26 which pumps the washing fluid from the bottom of the holding tank 14 through a series of filters 28 and 30 back into the top of the tank 14. This recirculation of the water aids in cleaning the water with the filters and also in mixing the ozone in the ozonated water washing fluid. The pump may be continuously or intermittently operated in order to keep the ozone evenly circulated within the water.

In a typical system using the present invention, the water is kept at room temperature and requires no soap or detergent during the washing process. Water from the storage tank 18 is pumped through the filter 20 to the holding tank 14. When a wash cycle is initiated, the ozonated water is pumped to the machines for the wash cycle. When the wash cycle is terminated, the used wash water is drained into the sump 16 and is eventually pumped back to the storage tank 18. Additional ozonated water is pumped to the machines for the rinse cycle and discharged to the sump when the rinse cycle is complete. Automatic level controls (not shown) such as float switches or level sensors control the transfer of water between the various storage and collecting areas. The recycled water is properly filtered using state of the art filter units so the water used in subsequent wash cycles is clean.

As indicated above, the system loses water by evaporation, spillage and splashing and through being carried away by the laundry at the completion of a cycle. This loss is replaced from a standard supply source of cold water. The replacement water represent only a small fraction of the amount of water used in similar systems where the use of soap, detergent and bleaches requires the wash water be disposed of and replaced after each use. It will be appreciated that modifications may be made in the system and apparatus described hereinabove in keeping within the scope of the present invention as defined in the following claims.

We claim:

1. An apparatus for washing laundry in a closed loop system using ozonated wash water comprising:
    a holding tank for maintaining a supply of wash water prior to use in a wash cycle;
    means for generating ozone;
    means for transferring the ozone into the holding tank;
    means for mixing and recirculating the ozone and the wash water in said holding tank;
    washing means for washing laundry;
    means for supplying the wash water and ozone from said holding tank to said washing means; and
    means for collecting spent wash water from said washing means at the end of a wash cycle for reuse for washing laundry.

2. The apparatus of claim 1 further including means for removing waste wash material from the spent wash water.

3. The apparatus of claim 2 wherein said removing means is a filter.

4. The apparatus of claim 1 including a source of water for replenishing wash water lost during the washing process.

5. The apparatus of claim 1 wherein said means for generating ozone includes at least one corona discharge unit having a high voltage discharge tube connected to a high voltage source for creating a corona discharge field on the outside thereof and having a non-linear air flow path on said outside of said tube permitting a non-linear air flow pattern through the corona discharge field.

6. The apparatus of claim 5 wherein said non-linear air flow path is helical.

7. The apparatus of claim 6 wherein said helical path is formed by a helical rib formed on the outside of said tube in combination with an outer sleeve on said tube.

8. The apparatus of claim 6 further including means for drawing air across said corona discharge unit causing the air to interact with the corona discharge field to create ozone.

9. The apparatus of claim 8 wherein said air drawing means is a pump connected in a discharge air flow path to said non-linear air flow path on said tube.

10. The apparatus of claim 9 wherein said discharge air flow path terminates in a discharge nozzle in said holding tank for entraining ozone into the wash water in said holding tank.

11. The apparatus of claim 10 further including a second mixing means adjacent said discharge nozzle for mixing ozone in the wash water as it enters into said holding tank.

12. The apparatus of claim 5 wherein said ozone generator means include a plurality of corona discharge units.

13. The apparatus of claim 12 further including means for cooling said corona discharge units.

14. The apparatus of claim 1 further including storing means for storing said spent wash water prior to reuse for washing laundry.

15. The apparatus of claim 14 further including means for transferring the spent wash water to the storing means and means for removing waste wash material from the spent wash water.

16. The apparatus of claim 14 wherein said storing means is a storage tank in fluid communication with the holding tank.

17. An apparatus for washing laundry in an closed loop system using ozonated wash water comprising:
    a holding tank for maintaining a supply of wash water prior to use in a wash cycle;
    means for generating ozone;
    means for mixing the ozone in the wash water in said holding tank;
    a washing means for washing laundry;
    means for transferring wash water from said holding tank to said washing means;
    means for collecting spent wash water from said washing means at the end of a wash cycle for reuse for washing laundry;
    means for storing said spent wash water prior to reuse for washing laundry; and,
    means for recirculating the spent wash water into the holding tank.

18. The apparatus of claim 17 further including means for removing waste wash material from the spent wash water.

19. The apparatus of claim 18 wherein said means for removing is a filter.

20. The apparatus of claim 17 further including means for mixing and recirculating the wash water in said holding tank.

21. The apparatus of claim 20 wherein said mixing and recirculating means is a recirculating line with a pump for pumping the wash water between the top and bottom of said holding tank.

* * * * *